Figures 1, 2:
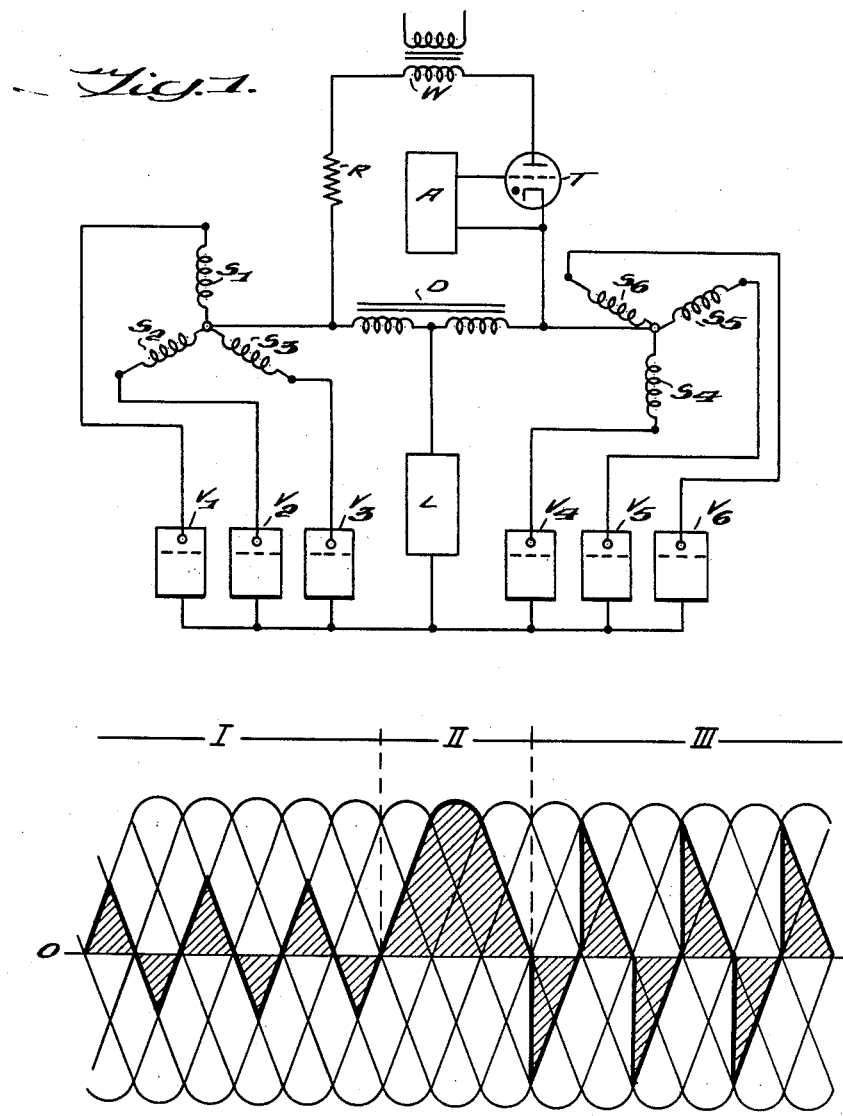

INVENTORS
Theodor Wasserrab
Karl Roth

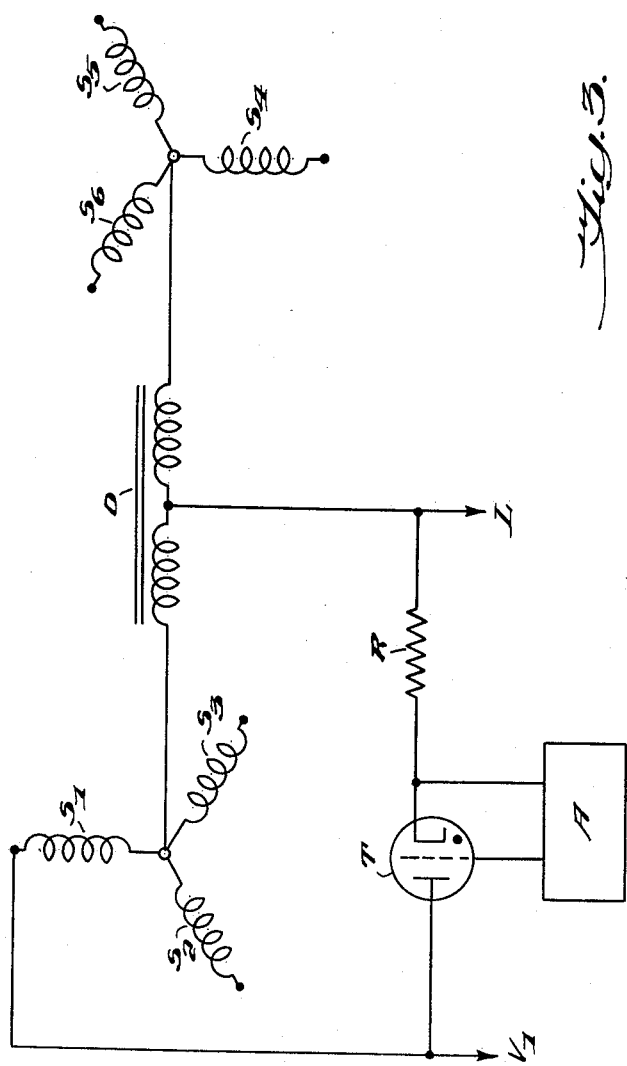

United States Patent Office 3,083,329
Patented Mar. 26, 1963

3,083,329
APPARATUS FOR OPERATION OF CONVERTERS WITH SUCTION CHOKES
Theodor Wasserrab, Wettingen, Aarg, and Karl Roth, Nussbaumen, Aarg, Switzerland, assignors to Aktiengesellschaft Brown, Boveri & Cie, Baden, Switzerland, a joint-stock company
Filed Aug. 15, 1960, Ser. No. 49,524
4 Claims. (Cl. 321—26)

The present invention relates to current converters for converting alternating current to direct current and has particular reference to an improved arrangement for current converters which are used, for example, to supply the direct current excitation of the windings on electromagnets employed to provide the magnetic field for an accelerator for charged particles such as, for example, a synchrotron. The magnet of such a particle accelerator is operated by pulses, there being effected first an excitation at increasing direct current and subsequently, after an extremely short transitional period, a de-excitation. The very considerable energy stored in the magnetic field is to be recuperated, at least in part, by operating the converter as an inverter. Accordingly, the converter must be changed over from rectifier operation to inverter operation in an extremely rapid manner, that is, within less than one cycle of the alternating current used to feed the converter. The individual pulses usually have between them current-free intervals of shorter or longer duration.

In the accompanying drawings which will illustrate the invention, FIG. 1 is an electrical schematic diagram of one embodiment of the improved converter; FIG. 2 is plot of curves illustrating the course of the voltage existing on a suction choke coil element of the converter; and FIG. 3 is also a schematic diagram illustrating a modification for a part of the circuit shown in FIG. 1.

In view of the efficiencies required, such converter-inverters are, as a general rule, operated in six-phase connection. They therefore comprise, in an arrangement well known in itself, a transformer having two groups of three secondary windings each arranged in star connection, a grid controlled valve such as a thyratron, ignitron, or semi-conductor valve connected by its anode to each secondary, a common load which is for example the excitation winding of a magnet element of a particle accelerator, and a suction choke, one terminal of the load being connected to the cathode of each valve, and the other load terminal being connected through the center tap on a suction choke to the star point of each group of three secondary windings. Such an arrangement is illustrated in FIG. 1, one group of three secondary windings of the transformer being designated S1, S2 and S3 and the other group of three secondary windings being designated S4, S5 and S6. The control valves for the secondary winding group S1 to S3 are indicated at V1 to V3 respectively, and the control valves for the secondary winding group S4 to S6 are indicated at V4 to V6 respectively. The primary of the transformer is not illustrated. The load is indicated schematically by the block legended L and the suction choke is indicated at D. The remaining elements shown in FIG. 1 constitute one embodiment of the improvement according to the present invention and will be discussed later.

The course of the voltage existing at choke D is indicated by the bold lines in FIG. 2. The voltage existing on choke D during operation of the converter as a rectifier, i.e. converting alternating current to direct current for flow through the load L is indicated at area I; the voltage on choke D during the transition period in changing over from converter to inverter operation is indicated by area II; and the voltage on choke D during operation as an inverter when recuperating some of the energy stored in the magnetic field of the load is indicated by area III. It will be evident from an inspection of FIG. 2 that during the transition period II, the suction choke must absorb a voltage-time area of the size of a half-wave of the alternating current which feeds the transformer secondaries. This voltage-time area is located entirely to one side of the horizontally extending zero voltage line indicated by Ot, and hence the potential stress on choke D during each pulse is therefore non-symmetrical, the area being all positive, i.e. above line Ot, or all negative, i.e. below this line depending upon the time of the change-over.

It is clear that the suction choke D of a current converter thus operated must be so rated that it can absorb, without becoming saturated, the voltage-time area occurring during change-over, which is much greater in comparison with normal operation. The non-symmetrical stress of the suction choke repeated during each pulse results, however, in an uncontrollable shifting of the working point, which is particularly disturbing because for the present method of operation, chokes with high-grade iron are used, in which the magnetic remanence is very marked. The impedance of the choke will therefore likewise vary in an uncontrollable manner.

In accordance with the invention, this disadvantageous operating characteristic of the converter is suppressed in that the choke is biased, i.e. pre-magnetized at the latest, at the beginning of each work cycle, for example, in each of the current-free intervals between successive pulses, in the sense and degree that during the subsequent work cycle, no saturation occurs. The biasing can be effected with the use of a special circuit containing a controllable valve with which an exactly timed voltage pulse can be applied to the suction choke. Such a special biasing circuit is shown in FIG. 1, the arrangement including the secondary winding W of an auxiliary transformer which is connected across the end terminals of choke D through a controllable valve T, for example, a thyratron, and a limiting resistance element R. Valve T has its grid connected to a control element A which is so arranged that it opens valve T in each current-free interval during a half-wave of suitable polarity, in such manner that current flows from the transformer secondary W through a series circuit composed of limiting resistance R, valve T and choke D, and so biases the choke D with a voltage-time area which corresponds, with opposite sign, to the non-symmetrical voltage-time area to be expected in the next work cycle. The stress imposed upon choke D over each work cycle, including the preceding current-free interval, will then be symmetrical.

The arrangement shown in FIG. 3 for obtaining the desired bias on choke D is somewhat more simplified and eliminates the necessity for providing a special auxiliary transformer as the source of the biasing current. Instead, one of the secondary windings of the converter-transformer itself is utilized. In the illustrated embodiment, secondary winding S1 is selected as the source of biasing current, and the controllable valve T and limiting resistance R are connected in series with one half of the choke D. This circuit is very advantageous especially when the suction choke D is located in the oil tank of the converter-transformer itself, the two ends of its winding being inaccessible from the outside.

It is also possible to effect the desired biasing of choke D without the use of a special circuit. For this, for example, only the three control valves V1 to V3, or V4 to V6 may at first be opened for a short time to initiate a work cycle. Then again, one half of the choke winding D is admitted with a biasing voltage pulse. The brief opening of three valves may, of course, be effected at any time during the current-free interval.

In order that the state of choke D will always be the same after completion of the biasing regardless of the particular existing remanent magnetism, the biasing is advantageously carried out in two steps, the first step being a saturation brought about forcibly, and then a demagnetization effected to the proper degree by a voltage pulse acting in the opposite direction. Each step can be carried out separately by any method, in particular one of those described above. Saturation can be attained by selection of a sufficiently high biasing voltage in the time of a half-cycle of the feeding alternating current. If a free selection of this voltage is not possible, as for instance in the example according to FIG. 3, the duration of the biasing must be extended to more than one cycle. Thus, for example, the thyratron T in FIG. 3 can be opened during several half-cycles of the suitable polarity.

We claim:

1. Converter apparatus for use with a three-phase alternating current supply source comprising a transformer having its primary windings connected to said alternating current source and having two groups of three secondary windings, the secondary windings of each group being arranged in star connection such that one terminal end of each winding is connected to the common star point, a suction choke having a mid-tap on the winding thereof, the opposite ends of said choke winding being connected respectively to the star points on said two groups of secondary windings, six grid-controlled valves associated respectively with the six secondary windings, each said valve having its anode connected to the other terminal end of its associated secondary winding, circuit means interconnecting the cathodes of said valves, an inductive load having one terminal thereof connected to the cathodes of said valves and the other terminal connected to the mid-tap on the winding of said suction choke, said valves each being controlled for successive operation as a rectifier and as an inverter with a current free interval after inverter and before next rectifier operating functions of said valves, the change-over from rectifier to inverter operation occurring within a cycle of said alternating current supply source, and means for pre-magnetizing said suction choke winding in each current free interval, the polarity of the pre-magnetization applied to said choke winding being of opposite sign to and corresponding in its voltage-time characteristic with the magnetization produced in said choke winding by the current flowing therethrough in the next following operating function of said valves.

2. Converter apparatus as defined in claim 1 wherein said means for pre-magnetizing said choke winding comprises a source of alternating current having one terminal thereof connected via a resistance with one end of said choke winding, a grid controlled valve device having its anode connected to the other terminal of said alternating current source and its cathode connected to the other end of said choke winding, and means controlling the grid of said valve device such as to render said valve conductive in said current free intervals between inverter and rectifier operations.

3. Converter apparatus as defined in claim 1 wherein said means for pre-magnetizing said choke winding comprises a grid controlled valve device having its anode connected to one of said secondary windings and its cathode connected via a resistance with the mid-tap on said choke winding, and means controlling the grid of said valve device such as to render said valve conductive in said current free intervals between inverter and rectifier operations.

4. Converter apparatus as defined in claim 1 wherein said means for pre-magnetizing said choke winding comprises means for opening briefly the valves associated with the secondary windings of one group while the valves associated with the other group of secondary windings remain closed.

References Cited in the file of this patent

UNITED STATES PATENTS

| | | |
|---|---|---|
| 1,433,155 | Schenkel | Oct. 24, 1922 |
| 1,712,677 | Peter | May 14, 1929 |
| 1,774,822 | Andrewes | Sept. 2, 1930 |
| 1,873,952 | Aubort | Aug. 30, 1932 |
| 2,630,557 | Bixby | Mar. 3, 1953 |
| 2,930,962 | Weil | Mar. 29, 1960 |